April 23, 1968     J. H. MERCIER     3,379,216
PRESSURE VESSEL
Filed Nov. 9, 1965
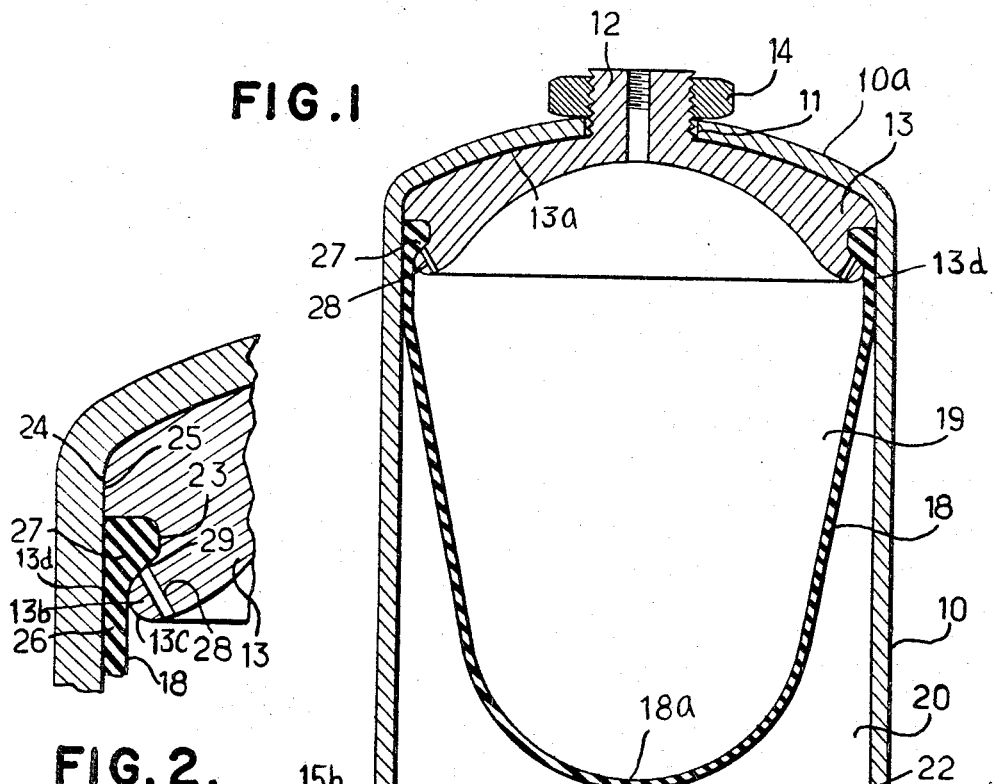
FIG.1
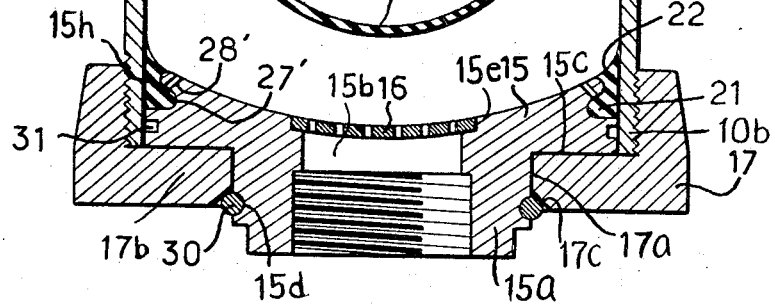
FIG.2.
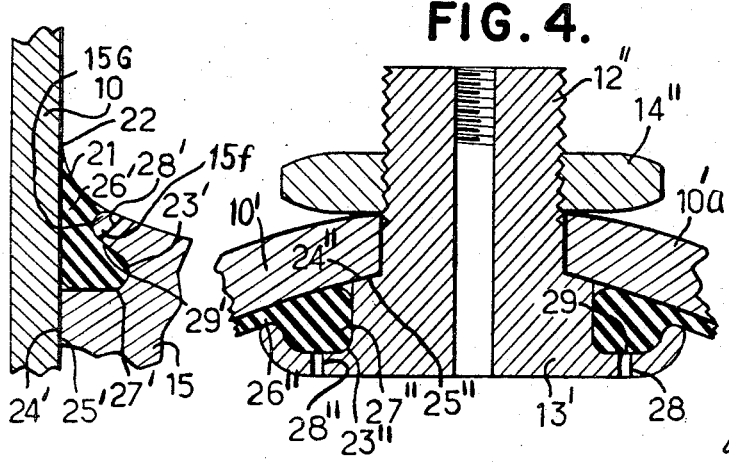
FIG.3
FIG.4.
INVENTOR
JACQUES H. MERCIER
ATTORNEY

United States Patent Office 3,379,216
Patented Apr. 23, 1968

3,379,216
PRESSURE VESSEL
Jacques H. Mercier, New York, N.Y., assignor to Mercier Olaer Patent Corporation, Wilmington, Del., a corporation of Delaware
Filed Nov. 9, 1965, Ser. No. 507,019
Claims priority, application France, Nov. 16, 1964, 995,053, Patent 1,422,967
6 Claims. (Cl. 138—30)

This invention relates to the art of pressure vessels, more particularly of the type having a deformable partition as the separator between the liquid and gas contained therein.

As conductive to an understanding of the invention, it is noted that in a pressure vessel of the above type in which the separator has an annular bead at its periphery, which is positioned in an annular groove in a retainer member, so that when the retainer is moved against the wall of the pressure vessel, the bead will be clamped between the groove and the adjacent wall surface of the pressure vessel to form a seal, as the separator is stressed in use, tension will be applied to the bead which tends to pull it away from the space between the abutting surfaces of the retainer and the pressure vessel so that the seal normally effected by such bead with respect to such space is broken.

According to the invention the fluid under pressure in the container, as for example, the gas under pressure in the gas chamber, defined on one side of the separator, is directed to react against the bead to urge the latter into said space to maintain the bead in sealing position.

In the accompanying drawings in which are shown one or more of various possible embodiments of the several features of the invention, FIG. 1 is a longitudinal sectional view of a pressure vessel according to the invention, FIG. 2 is an enlarged detail sectional view showing the sealing arrangement at the periphery of the flexible separator, FIG. 3 is an enlarged detail sectional view showing the sealing arrangement applied to the container of the pressure vessel, and FIG. 4 is a view similar to FIG. 2 of another embodiment of the invention.

Referring now to the drawings, the pressure vessel illustratively comprises a substantially cylindrical container 10 of rigid material such as steel or aluminum capable of withstanding the pressure to which it is subjected in use.

The container has one end closed as at 10a and such closed end is provided with an axial port 11.

Positioned in the container is a disc shaped retainer member 13 which has a curved top surface 13a which conforms to the curvature of the closed end 10a of the container. The retainer disc 13 has an axial stem 12 which extends through axial port 11 and is retained in position by nut 14.

Positioned in the container is a deformable partition illustratively in the form of an elongated bladder 18 of rubber or similar material having like characteristics. The bladder is closed at one end as at 18a and the mouth of the bladder has an inwardly spaced bead 27 defining the rim of the bladder. The bladder divides the inner space of the container 10 into two chambers, i.e., a gas chamber 19 and a liquid chamber 20.

As shown in FIG. 1, the diameter of the retainer disc is just slightly less than that of the container 10, so that it will fit therein with little clearance as indicated at 24, 25 (FIG. 2). The outer surface of the side wall of the disc has an annular groove 23 therein designed to accommodate the bead 27. The portion 13b (FIG. 2) of the side wall of the disc between the annular groove 23 and the inner periphery 13c of the disc is of reduced diameter so that the outer surface of side wall portion 13b will be spaced from the inner surface of the container wall as shown in FIGS. 1 and 2 at 13d.

Thus, with the bead 27 positioned in said groove 23, since the bead is of thickness greater than the transverse space between the wall of container 10 and the surface of the groove, it will be compressed in said groove and the portion 26 of the bladder wall adjacent the bead 27 will extend through the space 13d.

In order dependably to retain the bead 27 in said groove 23 and to maintain a seal, the portion 13b of the disc 13 has passageways 28 therethrough, one end of each of which is in communication with the gas chamber 19 and the other end 29 of which is in communication with the portion of groove 23 between the surfaces 24, 25 and the space 13d.

The mouth 10b of the container 10 is externally threaded and a cup-shaped closure cap 17 having an axial port 17a in the floor 17b thereof, is secured on such threaded end. Positioned in the container is a close disc 15 which has an axial stem 15a with an enlarged bore 15b extend therethrough, the stem extending through port 17a and protruding beyond the latter.

As shown in FIG. 1, the undersurface 15c of the closure disc 15 seats on the flat surface of floor 17b of cap 17. The protruding portion of the stem 15a has an annular groove 15d which receives a split ring 30, the latter coacting with the beveled periphery 17c of the port 17a releasably to lock the closure cap 17 and closure disc 15 together so that the disc 15 may be removed together with the cap 17.

As shown in FIG. 1, the inner end of bore 15b is of enlarged diameter as at 15e to provide a seat for the periphery of a strainer plate 16, the perforations of which are of sufficient size to permit ready flow of liquid therethrough, but prevent extrusion of the bladder.

The inner surface of disc 15 as well as the strainer plate 16 are concave as shown, to provide a smooth continuous surface against which the bladder 18 may abut in operation of the pressure vessel.

The diameter of the disc 15 is just slightly less than that of the container 10 so that it will fit therein with little clearance as at 24', 25' (FIG. 3). The outer surface of the side wall of the disc adjacent the inner portion thereof has an annular groove 23' therein, designed to accommodate the inwardly extending bead 27' of a sealing ring 21. The portion 15f of the side wall of the disc 15 between the annular groove 23' and the inner periphery 15g of the disc is of reduced diameter so that the outer surface of the side wall portion 15f will be spaced from the inner surface of the container as shown in FIG. 1 at 15h.

Thus, with the bear 27' positioned in said groove 23', since the bead 27' is of thickness greater than the transverse space between the wall of container 10 and the surface of the groove, it will be compressed in said groove and the portion 26' of the ring 21 adjacent the bead 27' will extend through the space 15h.

The inner surface of ring 21 is curved as shown forming a fillet 22 and completes the continuity of the surfaces against which the expanded bladder 18 will press.

The portion 15f of the disc 15 has passageways 28' therethrough, one end of each of which is in communication with the liquid chamber 20 and the other end 29' of which is in communication with the portion of groove 23' between the surfaces 24', 25', and the space 15h.

In the operation of the pressure vessel above described, the chambers 19 and 20 are charged with gas and liquid respectively under pressure.

When the pressure vessel is used, the bladder 18 will be expanded and compressed. The expansion of the bladder will cause tension to be exerted against the bead 27 which tends to move it out of the groove 23, thereby breaking the seal effected thereby. However, by reason of the passageways 28, the pressure in the gas chamber 19 will react against the bead in direction tending to wedge the latter into the space between the engaging surfaces 24, 25 (FIG. 2) thereby maintaining the bead 27 in effective sealing position.

Similarly, the pressure in the chamber 20 will react against the bead 27' in direction tending to urge the latter into the space between the engaging surfaces 24', 25' thereby maintaining the bead 27' in effective sealing position.

The embodiment shown in FIG. 4 is designed for use where the bladder has a relatively small mouth. Accordingly, the retainer disc 13' is also relatively small and is provided with an annular groove 23" in its top surface spaced outwardly from the root end of stem 12" to define an annular shoulder 25" which seats against the undersurface 24' of the closed end 10'a of shell 10' when nut 14" is tightened. As a result, the bead 27" at the mouth of the bladder in annular groove 23" will be compressed between the floor of the groove and the opposed portion of closed end 10'a to form a seal, the abutment of shoulder 25" against wall portion 24" preventing cutting of the bladder portion 26" when the nut 14" is tightened.

The groove 27" has passageways 28" leading thereinto to effect the wedging action of the bead into the space between surfaces 24", 25" in the manner previously described.

With the constructions above described, dependable seals will be provided which will prevent leakage of gas or liquid from the container regardless of slight defects in manufacture which cause excessive tolerances to result.

In use of the pressure vessel, variations in pressure may cause variation in the diameter of the container to a greater or lesser degree depending upon the material used. As a result, the distance between the wall of container 10 and the side wall of disc 13 may increase. However, by reason of the passages 28 (FIG. 1) the resulting wedging action of the bead will cause the desired sealing action to be maintained. This is also true of the beads 27' and 27".

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a container of rigid material having two ports, a flexible separator of resilient deformable material positioned in said container and intervening between said ports to define a gas and liquid chamber, said separator having a peripheral annular bead, a retaining disc in said container having an annular groove therein and having an annular surface on one side of the groove adapted to abut against the inner wall surface of said container, the portion of said disc on the other side of said groove being spaced from the adjacent inner wall surface of said container, said bead being positioned in said annular groove with the adjacent portion of said separator wall extending through said space, and passage means extending through said disc and into said annular groove, said passage means being in communication at one end with said gas chamber and positioned so that the gas pressure in said gas chamber will react against said bead to wedge the latter into the space between said abutting surfaces to maintain an effective seal.

2. The combination set forth in claim 1 in which said container is substantially cylindrical and has one end closed, said closed end having an axial port, said retaining disc is of substantially the same diameter as said container and has an axial stem extending through said port, means coacting with said stem securely to retain said disc against the closed end of said container, said annular groove being in the side wall of said disc.

3. The combination set forth in claim 1 in which said container is substantially cylindrical and has one end closed, said closed end having an axial port, said retaining disc has an axial stem extending through said port, means coacting with said stem securely to retain said disc against the closed end of said container, said annular groove being in the top wall of said disc outwardly of the root end of said stem.

4. The combination set forth in claim 1 in which said container is substantially cylindrical and has an open end, means to close said open end, said means comprising a closure disc positioned in said open end and of diameter just slightly less than the latter, the side wall of said disc having an annular portion on the outer side of said groove in juxtaposition to the wall of the container at its open end, and an annular portion on the inner side of said groove spaced from the wall of said container, a sealing ring having an annular bead positioned in said annular groove and an annular portion extending through said space, said disc having passage means extending therethrough into said annular groove, said passage means being in communication at one end with said liquid chamber and positioned so that the liquid pressure in said liquid chamber will react against said bead to wedge the latter into the space between the annular portion of the disc on the outer side of the groove and the wall of the container.

5. The combination set forth in claim 4 in which a cup-shaped closure cap is provided having an axial port, means to secure said cap to the open end of said container, said closure disc having an axial stem which protrudes through the axial port of said closure cap, and means releasably to lock said disc and said cap together.

6. The combination set forth in claim 4 in which the inner surface of said sealing ring and said closure disc are concave to present an uninterrupted surface against which the expanded partition may press.

References Cited
UNITED STATES PATENTS

| | | | |
|---|---|---|---|
| 1,911,755 | 5/1933 | Grover | 277—78 |
| 2,462,596 | 2/1949 | Bent | 277—78 |
| 3,038,501 | 6/1962 | Greer | 138—30 |

C. L. HOUCK, *Assistant Examiner.*

LAVERNE D. GEIGER, *Primary Examiner.*